(12) United States Patent
Passe

(10) Patent No.: US 10,998,970 B1
(45) Date of Patent: May 4, 2021

(54) DOCKING STATION FOR CONNECTING TO PERSONAL COMPUTER WIRELESS DEVICES USING LIGHT COMMUNICATION

(71) Applicant: Securus Technologies, Inc., Carrollton, TX (US)

(72) Inventor: Scott Passe, Forney, TX (US)

(73) Assignee: Securus Technologies, LLC, Carrollton, TX (US)

( * ) Notice: Subject to any disclaimer, the term of this patent is extended or adjusted under 35 U.S.C. 154(b) by 0 days.

(21) Appl. No.: 16/695,145

(22) Filed: Nov. 25, 2019

(51) Int. Cl.
  *H04B 10/114* (2013.01)
  *G06F 1/16* (2006.01)
  *H04B 10/80* (2013.01)

(52) U.S. Cl.
  CPC ....... *H04B 10/1143* (2013.01); *G06F 1/1632* (2013.01); *H04B 10/807* (2013.01)

(58) Field of Classification Search
  CPC .. H04B 10/11–116; H04B 10/806–808; G06F 1/1632
  See application file for complete search history.

(56) References Cited

U.S. PATENT DOCUMENTS

| | | | | |
|---|---|---|---|---|
| 6,535,983 B1* | 3/2003 | McCormack | ........... | G06F 1/266 370/410 |
| 6,944,402 B1* | 9/2005 | Baker | ................ | H04B 10/1143 398/118 |
| 10,416,715 B1* | 9/2019 | Wade | .................. | H04M 1/7255 |
| 2008/0253766 A1* | 10/2008 | Yu | ......................... | H04B 10/116 398/41 |
| 2009/0171571 A1* | 7/2009 | Son | ..................... | H04B 10/1149 701/532 |
| 2013/0163994 A1* | 6/2013 | Iizuka | ................ | H04B 10/1149 398/130 |
| 2013/0260677 A1* | 10/2013 | Partovi | ............... | H04B 5/0037 455/41.1 |
| 2015/0067785 A1* | 3/2015 | Donnellan | ........... | H04W 12/06 726/4 |
| 2015/0123766 A1* | 5/2015 | St. John | ................. | G07C 9/257 340/5.84 |
| 2017/0099572 A1* | 4/2017 | Breuer | ................. | G01C 21/206 |
| 2017/0104531 A1* | 4/2017 | Aggarwal | .............. | G08C 23/04 |

\* cited by examiner

*Primary Examiner* — Casey L Kretzer
(74) *Attorney, Agent, or Firm* — Fogarty LLP

(57) ABSTRACT

A communication system comprises a network configured to support data, voice, and video communications and a docking station coupled to the network and configured to provide data connections to a personal computer wireless device, wherein the personal computer wireless device is configured to communicate with the docking station using light communication. A method for accessing the communication system comprises connecting a personal computer wireless device to a docking station using light communication and identifying a current location of the personal computer wireless device based upon LC with the docking station or an LC access point. One or more selected applications may be enabled or disabled on the personal computer wireless device based upon the current location.

26 Claims, 4 Drawing Sheets

DOCKING STATION FOR CONNECTING TO PERSONAL COMPUTER WIRELESS DEVICES USING LIGHT COMMUNICATION

BACKGROUND

Correctional facilities, such as prisons and jails, usually allow residents (i.e., inmates) to communicate with family, friends, attorneys, and others outside the facility to allow the residents to maintain personal connections and to facilitate their transition back into society upon release. Most controlled-environment facilities allow some form of telephone calls, in-person visitation, video visitation, etc. for such communication. Traditional visitation sessions provided by controlled-environment facilities include telephone calls and in-person visits. Technological advances have allowed controlled-environment facilities to provide other types of monitored visitation sessions, including audio conferences, video conferences, video messages, email, and online chat sessions. Visitation sessions may be conducted via portable computing devices issued to residents on a temporary or permanent basis.

Portable computing devices, including tablets, laptop computers, and personal digital assistants, allow users to access many of the functions of a personal computer while facilitating freedom of movement. Portable computing devices can offer a very high level of mobility and flexibility to the user. Portable computing devices are generally lightweight and compact, but these devices can also be subject to certain limitations, such as smaller keyboards and displays, reduced battery storage, lack of a keyboard, mouse, or printer ability, restricted network connections, or limited memory/data storage.

In addition to providing increased opportunities for visitations, additional services may be provided to residents via a portable computing device. For instance, a portable computing device may provide residents with educational and counseling services. A portable computing device may also be used to provide residents with entertainment services, such as gaming services and access to digital content. The availability of such services may be limited based on bandwidth limitations within a controlled-environment facility. In many scenarios, the demand for wireless bandwidth within a controlled-environment facility far exceeds the bandwidth that is actually available. These bandwidth limitations are magnified as greater numbers of portable computing devices are issued. Additionally, due to the movable nature of portable computing devices, correctional facilities may need to control where residents are able to use such devices.

SUMMARY

The present invention is directed to systems and methods for accessing a communication system. In one embodiment, a communication system comprises a network configured to support data, voice, and video communications and a docking station coupled to the network and configured to provide data connections to a personal computer wireless device, wherein the personal computer wireless device is configured to communicate with the docking station using light communication.

The docking station may be coupled to the network over a pair of low-voltage wires having an electrical current sufficient to power the personal computer wireless device. The docking station may further comprise a light communication (LC) transmitter, an LC receiver, a processor for controlling the device according to executable code, and memory for storing data and executable code, wherein the executable code comprises instructions for causing the processor to establish LC communication with the personal computer wireless device. The executable code may further comprise instructions for causing the processor to establish LC communication with an LC access point using the LC transmitter, the LC receiver, or both. The LC transmitter may be a Light Emitting Diode (LED), and the LC receiver may be a photodetector. The light communication may be established using a visible light spectrum, an invisible light spectrum, or both.

The personal computer wireless device may further comprise an LC transmitter, an LC receiver, a processor for controlling the device according to executable code, and memory for storing data and executable code, wherein the executable code comprises instructions for causing the processor to establish LC communication with the docking station. The executable code may further comprise instructions for causing the processor to establish LC communication with an LC access point using the LC transmitter, the LC receiver, or both. The executable code may further comprise instructions for causing the processor to identify a current location of the personal computer wireless device based upon LC communication with the LC access point or the docking station or both. The executable code may further comprise instructions for causing the processor to enable one or more selected applications on the personal computer wireless device based upon a current location. The executable code may further comprise instructions for causing the processor to disable one or more selected applications on the personal computer wireless device based upon a current location. The executable code may further comprise instructions for causing the processor to generate a transmission from the personal computer wireless device to report a current location to a remote device. The executable code may further comprise instructions for causing the processor to periodically update a current location of the personal computer wireless device based upon communication with the LC access point or the docking station.

The executable code may further comprise instructions for causing the processor to establish a session with a remote device, and exchange session data with the remote device using LC communication with the docking station. The session and session data may be associated with one or more of phone call, video visitation, email, messaging, gaming, and entertainment.

In another embodiment, a method for accessing a communication system comprises connecting a personal computer wireless device to a docking station using light communication, wherein the docking station is connected to a network that is configured to support data communications, and identifying a current location of the personal computer wireless device based upon LC with the docking station or an LC access point. The method may further comprise enabling one or more selected applications on the personal computer wireless device based upon the current location or disabling one or more selected applications on the personal computer wireless device based upon the current location.

The method may further comprise establishing a session between the personal computer wireless device and a remote device and exchanging session data with the remote device using both the LC communication with the docking station.

The personal computer wireless device may be configured for use in a controlled-environment facility, wherein the controlled-environment facility has a plurality of separate LC-accessible zones, and wherein identifying the current location of the wireless device further comprises identifying a specific LC-accessible zone in which the personal computer wireless device is located.

The method may further comprise tracking the personal computer wireless device across a plurality of locations, wherein each of the plurality of locations are associated with a different LC access point light transmitter or a docking station light transmitter or both. The method may further comprise generating an alert when the personal computer wireless device is not authorized for operation in the current location. The method may further comprise generating an alert when a current user of the personal computer wireless device is not authorized in the current location.

The method may further comprise allowing the personal computer wireless device to access a camera on the docking station or on the personal computer wireless device in response to connecting the personal computer wireless device to the docking station. The method may further comprise allowing the personal computer wireless device to access one or more peripheral devices in response to connecting the personal computer wireless device to the docking station. The one or more peripheral devices may be selected from the group consisting of a printer, a scanner, a keyboard, a mouse, a trackball, a handset, a local memory store, a cloud-based memory store, a media capture device, a biometric sensor, and an RFID transceiver.

BRIEF DESCRIPTION OF THE DRAWINGS

Figure 1:
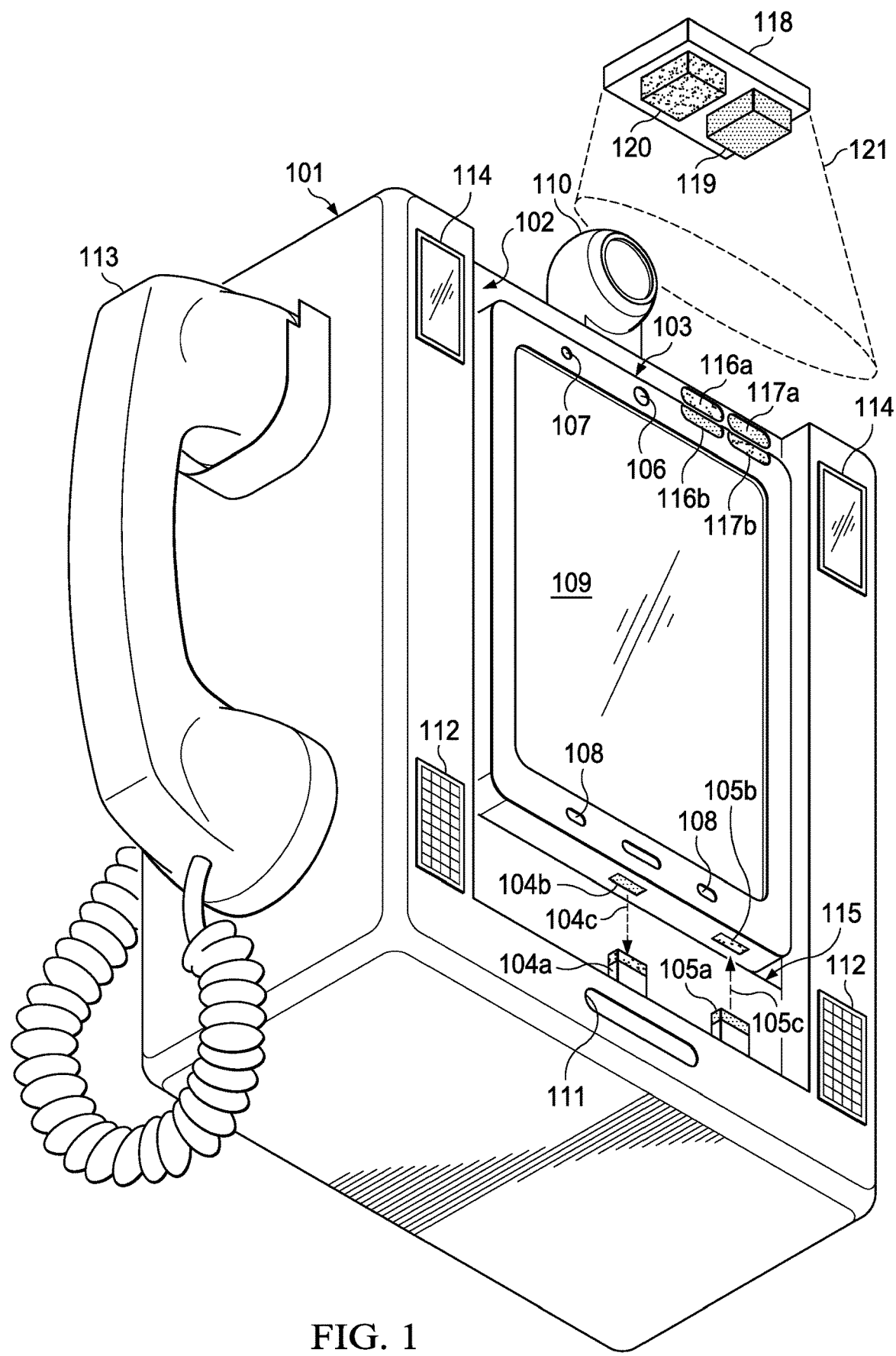

Having thus described the invention in general terms, reference will now be made to the accompanying drawings, which are not necessarily drawn to scale, and wherein:

FIG. 1 is a diagram of a docking station according to an example embodiment.

Figure 2:
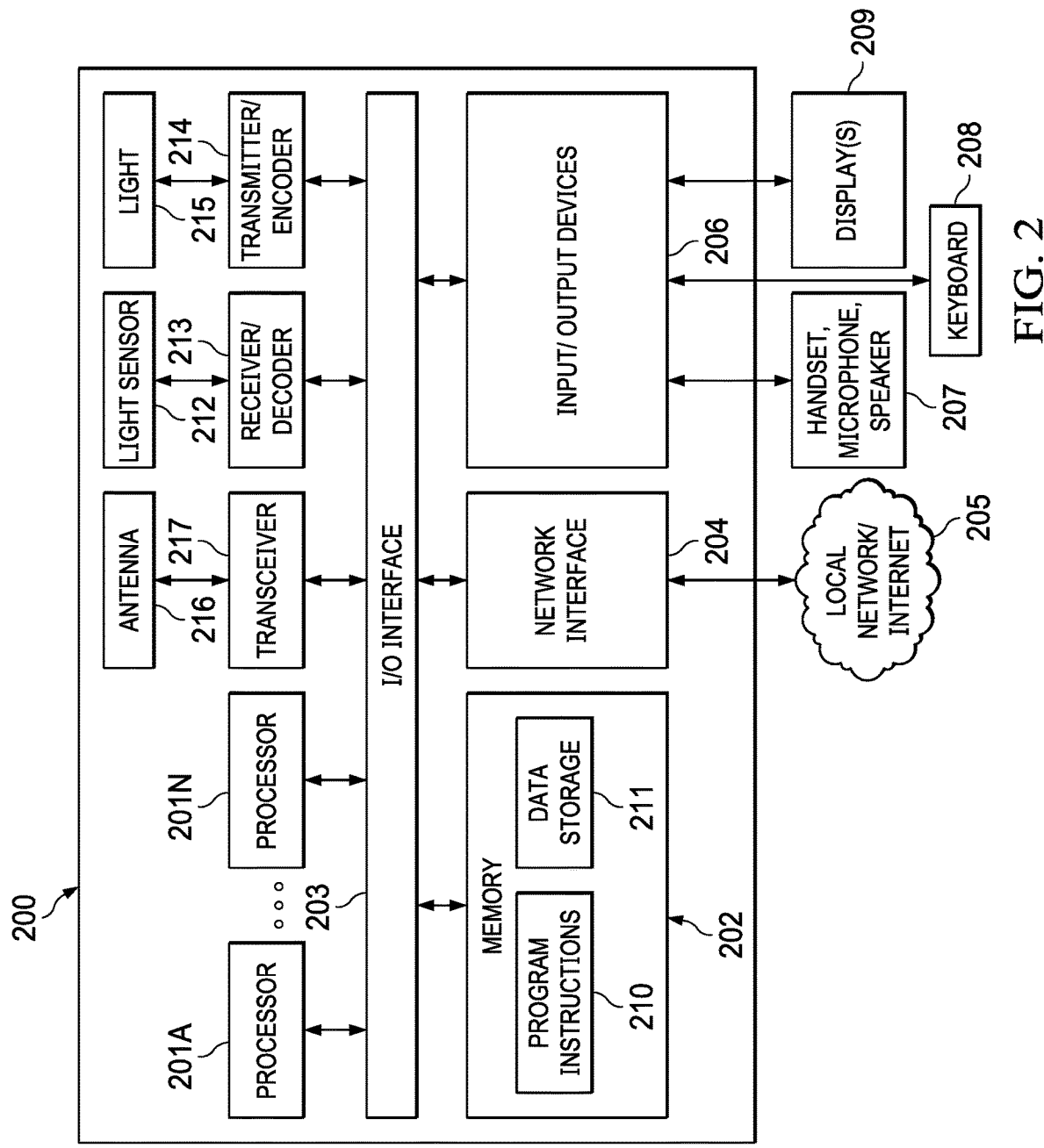

FIG. 2 is a block diagram depicting a communication device according to an example embodiment.

Figure 3:
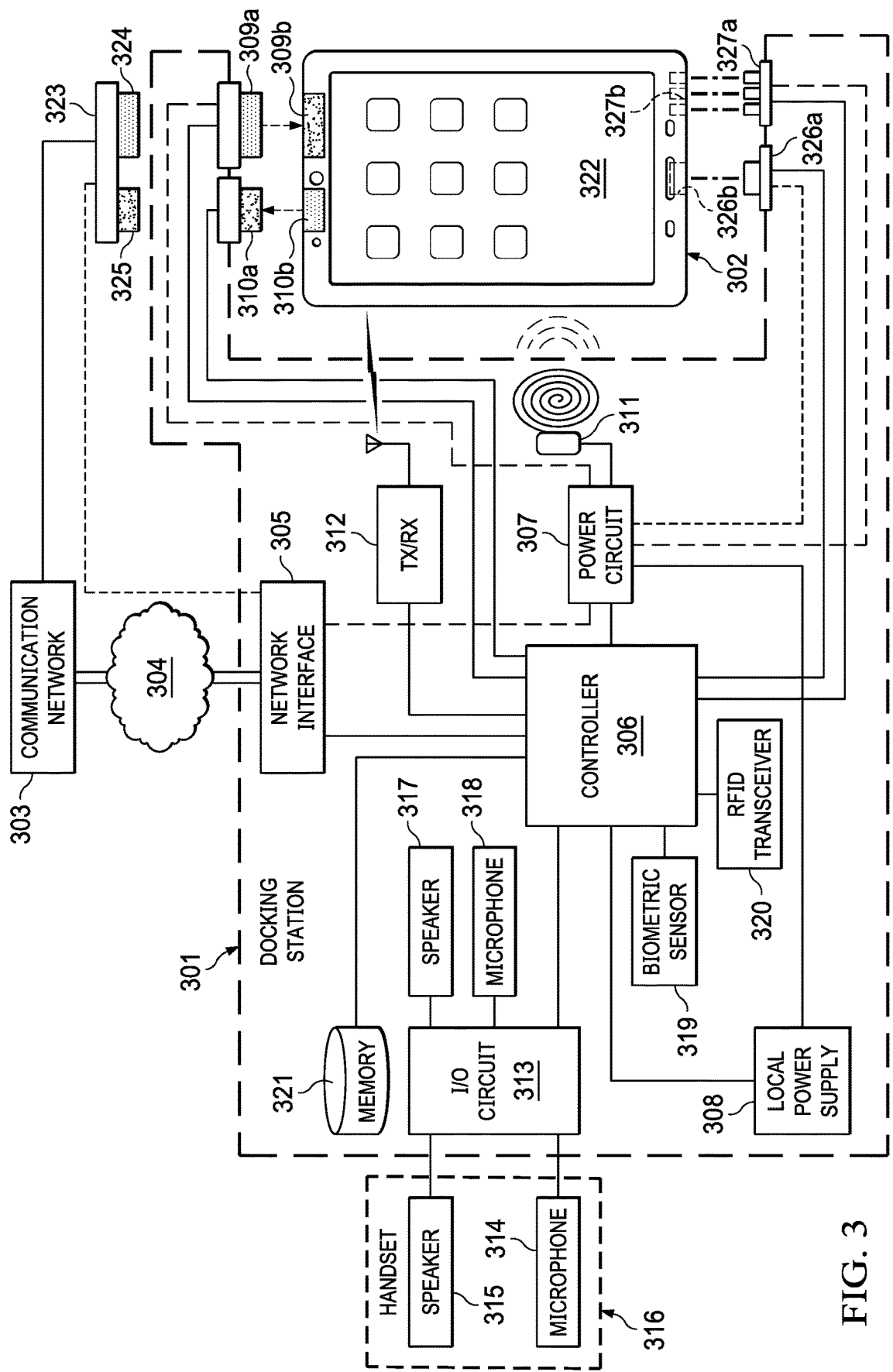

FIG. 3 is a block diagram illustrating components of a light communication docking station according to an example embodiment.

Figure 4:
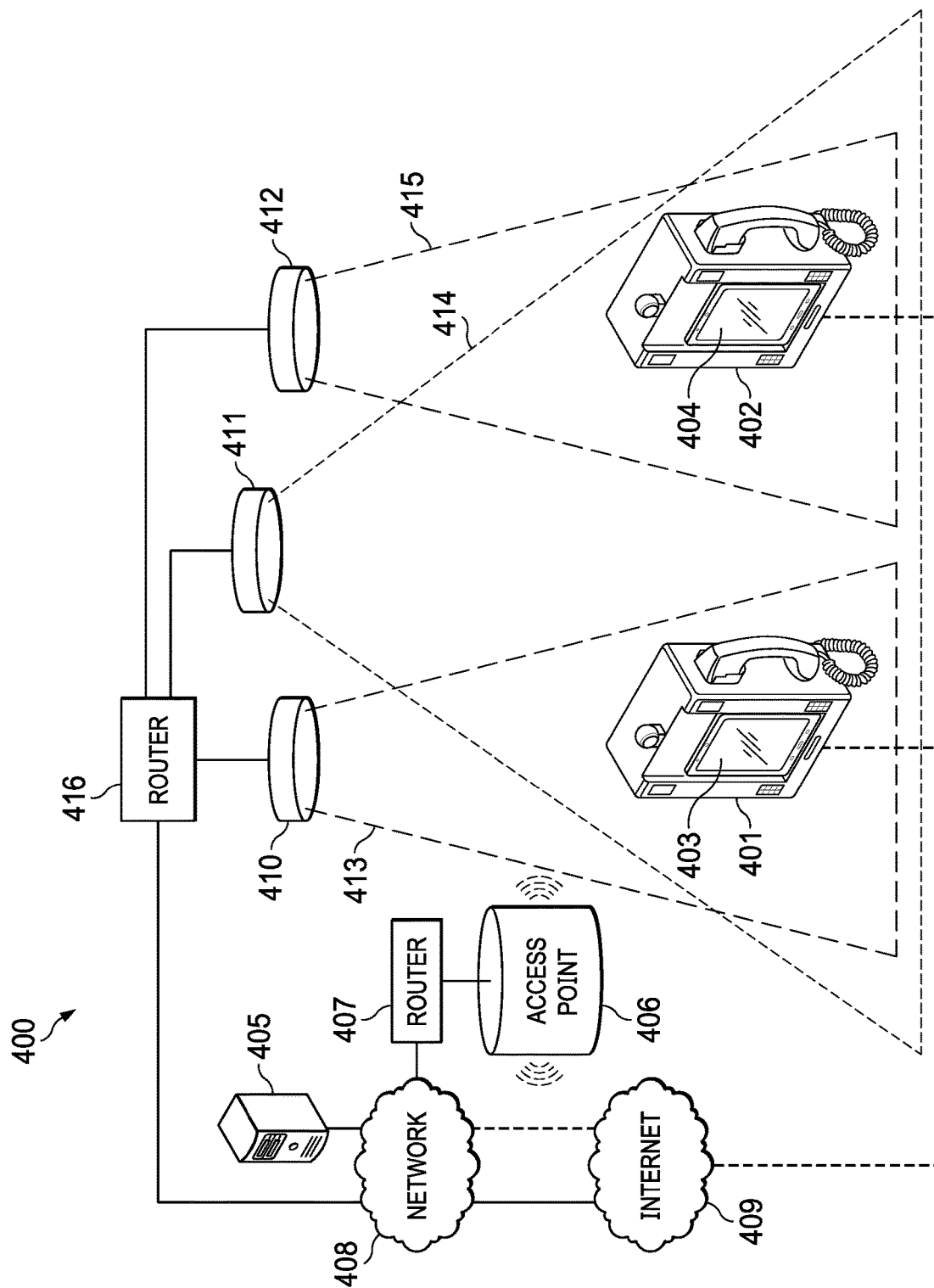

FIG. 4 depicts an example system for using docking stations with personal computer wireless devices according to an example embodiment.

While this specification provides several embodiments and illustrative drawings, a person of ordinary skill in the art will recognize that the present specification is not limited only to the embodiments or drawings described. The drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present disclosure relates generally to controlled-environment facilities and, more specifically, to providing wireless communications in such facilities. As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents. Moreover, the systems and methods described herein may be used to support communications in other facilities that have fewer or no access restrictions.

FIG. 1 is a diagram of a docking station 101 according to an example embodiment. Docking station 101 has an area 102 adapted to hold a personal computer wireless device 103. Area 102 may be a shelf, ledge, lip, slot, frame, detent, bracket, or other structure that is configured to hold personal computer wireless device 103 in or on docking station 101. Although area 102 is shown as a recessed area in FIG. 1, it will be understood that in other embodiments personal computer wireless device 103 may be positioned above docking station 101 (e.g., the bottom of personal computer wireless device 103 sitting on the top of docking station 101) or may be held in a position external to docking station 101 (e.g., on a ledge or bracket extending from the side of docking station 101). Personal computer wireless device 103 may be held in position by gravity (e.g., personal computer wireless device 103 sitting on a shelf or surface of docking station 101) and/or by a more secure method (e.g., using VELCRO®, magnets, straps, rails, or other fasteners or structures). Additionally, adapter sleeves or rails in area 102 may be used to ensure alignment of the personal computer wireless device 103 relative to docking station 101, which would allow docking station 101 to be used with different sizes of personal computer wireless devices 103.

Docking station 101 provides a connection to personal computer wireless device 103 using light communication (LC). LC may be supported using a light sensor 104*a* on docking station 101 that receives signals 104*c* from light transmitter 104*b* on device 103 and a light transmitter 105*a* on docking station 101 that sends signals 105*c* to light sensor 105*b* on device 103. Light sensors 104*a*, 105*b* detects light signals 104*c*, 105*c* and generates an electronic signal for a receiver/decoder that extracts data bits that are carried by light signals 104*c*, 105*c*. Data is sent using LC by encoding data bits into the signals that drive light transmitters 104*b*, 105*a*, which then broadcasts the information as light signals 104*c*, 105*c*. Any information that can be exchanged over traditional radio frequency (RF) data channels can also be exchanged over LC channels, such as digital bit streams, packet data, voice, video, text, or other content. Although the example personal computer wireless device 103 depicts a system having both transmit and receive capabilities for light communications, it will be understood that in other embodiments only LC transmit components (i.e., light transmitter 104*b*) or only LC receive components (i.e., light sensor 105*b*). Such single-direction LC systems may be used, for example, when the personal computer wireless device 103 only needs to transmit or only needs to receive data via an LC channel.

Light transmitters 104*b*, 105*a* may be a Light Emitting Diode (LED), for example. Light sensors 104*a*, 105*b* may be, for example, a camera, image sensor, or photodetector, such as a Complementary Metal Oxide Semiconductor (CMOS) sensor or other electronic chip that converts photons to electrons for digital processing. Light sensors 104*a*, 105*b* detect light signals 104*c*, 105*c* and generates an electronic signal for a receiver/decoder that extracts data bits that are carried by the light.

Light transmitters 104*b*, 105*a* and light sensors 104*a*, 105*b* may use invisible (e.g., infrared) and/or visible light spectrum for high speed data communication. Communication protocols available for LC may be referred to as Light Fidelity (Li-Fi) or Optical Wireless Communication (OWC) and may be defined in IEEE 802.11bb, IEEE 802.15.7m, 802.15.13, or other standards.

Light signals 104*c*, 105*c* may be used to pass data and/or power between docking station 101 and personal computer wireless device 103. For example, a transceiver in personal computer wireless device 103 may be configured to convert light power signals 104*c*, 105*c* to electrical energy for use in powering electrical components or charging a battery in device 103.

Light signals 104*c*, 105*c* may pass data and/or power between docking station 101 and personal computer wireless device 103 at the same time (i.e., simultaneously). Alternatively, multiple pairs of light transmitters and light sensors may be used to transmit multiple light signals to and/or from personal computer wireless device 103. Some of these links might be dedicated to one type of connection (e.g., power) and other links used for other connections (e.g., data).

Personal computer wireless device 103 may optionally have a camera 106, microphone, 107, and speakers 108 that allow a user to interact with the personal computer wireless device 103. Personal computer wireless device 103 has a display screen 109 that may provide an interface to application programs, which may be selected by touching application icons and/or using a keyboard. For example, personal computer wireless device 103 may have a physical keyboard attached (not shown) and/or may have a touch-sensitive screen that can display a virtual keyboard and/or one or more application icons. Display 109 may be any suitable electronic display such as a liquid crystal display (LCD), thin-film-transistor liquid-crystal display (TFT LCD), light-emitting diode (LED), touchscreen display (e.g., resistive, capacitive, etc.), or the like. Docking station 101 may also provide a camera 110, microphone 111, and speakers 112. Speakers 108 and 112 may be permanently affixed devices on personal computer wireless device 103 and docking station 101. Additionally, or alternatively, speakers 108 and 112 may be attached (e.g., by wire or wirelessly) as headphones or earbuds. Docking station 101 also has a handset 113 that provides a microphone and speaker interface. Docking station may also include lights 114 that can be used to illuminate the user who is in front of camera 110. When personal computer wireless device 103 is coupled to docking station 101, the camera 110, microphone 111, speakers 112, and/or handset 113 on the docking station may be used instead of, or in place of, camera 106, microphone 107, and/or speakers 108. Cameras 106, 110 may be any suitable imaging device, such as a video camera or webcam equipped with charge-coupled devices (CCDs), complementary metal-oxide-semiconductor (CMOS) active pixel sensors, etc. It will be understood that the size, positioning, orientation, and type of devices shown as connectors 104*a,b*, probes 105*a,b*, camera 110, microphone 111, speakers 112, and handset 113 in FIG. 1 are merely illustrative and that any appropriate replacement components may be used to provide the same functionality and operational capability as these examples. In another embodiment, for example, camera 110 may be embedded within docking station 101 in a form that has a lower profile and that is less exposed to damage or vandalism. Additionally, docking station 101 may have multiple cameras 110 to support facial recognition technology for biometrics or other applications. Camera 110 may be mounted to allow a user to tilt camera 110 to compensate for the user's position and/or capabilities.

Personal computer wireless device 103 may have limited input/output capabilities, such as having speakers 108 and display 109 only (i.e., no microphone or camera). This configuration allows a user to watch movies, listen to music, read e-books, and read/write messages on personal computer wireless device 103, but would not allow the user to participate in telephone calls or interactive video conferences. However, when personal computer wireless device 103 is coupled to docking station 101, then camera 110, microphone 111, speakers 112, and handset 113 are available to the user so that communications applications on personal computer wireless device 103 can be accessed to make telephone calls or join video conferences. Speakers 112 may be used as a microphone in other embodiments, which would eliminate the need for a separate microphone 111. Additional embodiments may include multiple microphones 111 to provide far field voice monitoring capability. Microphone 111 enables docking station 101 to clearly capture voice input in high ambient noise environments and/or to provide enhanced voice biometrics capability. In other embodiments (not shown), docking station 101 may also include a keyboard and/or may provide access to other network devices, such as a printer, scanner, storage drive, or the like.

Although the examples described herein refer to a personal computer wireless device 103, it will be understood that docking station 101 may provide data and power to a personal computer wireless device, such as any portable electronic device or computer-based system. Examples of personal computer wireless devices that may be used with docking station 101 include a tablet computer, laptop computer, smartphone, personal digital assistant, media player, e-book reader, or the like. In one embodiment, personal computer wireless device 103 may be specially adapted and/or approved for use by residents of a controlled-environment facility. For example, in a correctional institution (e.g., jail, prison, detention facility), personal computer wireless device 103 may be "stripped-down," particularly from the standpoint of the operating system capabilities, the application programs (apps) that are provided or allowed on personal computer wireless device 103, and/or the connectivity afforded personal computer wireless device 103. In a correctional facility environment, docking station 101 may have a hardened case and may be mounted on a wall or in a kiosk in location available to multiple users or residents having personal computer wireless devices.

Personal computer wireless device 103 may have a limited number of pre-installed applications on the device, such as communications, telephone calling, video conferencing, or video visitation applications. Installation of further applications on the device may be forbidden (e.g., prevented by the device's operating system) and/or restricted (e.g., requiring permission from an administrator).

A user may be prompted to provide a personal identification number (PIN), biometrics (e.g., facial recognition, fingerprints, finger geometry, iris recognition, vein recognition, retina scanning, voice recognition, or DNA matching) or other identifying information to access personal computer wireless device 103. Either docking station 101 and/or personal computer wireless device 103 may have a biometric sensor (not shown) to authenticate user biometric information.

Docking station 101 may be configured to allow light transmitters 104b, 105a and light sensors 104a, 105b to contact each other or to keep the light transmitters 104b, 105a and light sensors 104a, 105b at a set distance. For example, personal computer wireless device 103 may rest on a ledge or shelf 115 in area 102 to maintain a desired separate between light transmitters 104b, 105a and light sensors 104a, 105b.

It will be understood that the light sensors and light transmitters may be mounted in any position on docking station 101 and/or personal computer wireless device 103. In addition to, or in place of, light transmitters 104b, 105a and light sensors 104a, 105b on the bottom of personal computer wireless device 103. In an alternative embodiment, LC signals may also be exchanged using one or more pairs of light transmitters 116b, 117a and light sensors 116a, 117b positioned on top of docking station 101 and personal computer wireless device 103. The light sensors and light transmitters may also be mounted on the front, back, or sides of personal computer wireless device 103.

The light sensors and light transmitters may also be mounted separate from docking station 101. For example, docking station 101 may be mounted on a wall or pedestal, and a separate LC access point 118 may be mounted above docking station 101 on a ceiling or wall. LC access point 118 includes light transmitter 119 and/or light sensor 120 that are configured to transmit and/or receive light signals within a coverage area or attocell 121. When docking station 101 and/or personal computer wireless device 103 are within attocell 121, light signals transmitted by light transmitter 119 may be received by light sensors 116a, 117b and/or light signals transmitted by light transmitters 116b, 117a may be received by light sensor 120. Like personal computer wireless device 103, docking station 101 may also be mobile or portable. Personal computer wireless device 103 may be adapted to connect only to a network provided by the controlled-environment facility and/or only in certain locations within the controlled-environment facility. Such connectivity may be limited by controlling the availability of access to certain areas through the placement of LC access points 118 or adjusting the coverage area 121 of such wireless access points. Docking station 101 and/or personal computer wireless device 103 may communicate with attocell 121 only when in a specific location under LC access point 118.

Attocell 121 can be used for geofencing by defining specific areas in which personal computer wireless device 103 can be used and/or by detecting when personal computer wireless device 103 is active within the specific area. Attocell 121 may be related to a particular type of media access. For example, an inmate might be approved to look at movies in one section of a jail, electronic books in a library area, medical forms in a medical area, or a menu app in a dining area, wherein each area is associated with a particular attocell 121.

The example illustrated in FIG. 1 only shows the light communication connections between docking station 101 and personal computer wireless device 103, such as light transmitters 104b, 105a and light sensors 104a, 105b. In other embodiments, docking station 101 and personal computer wireless device 103 may also have a physical electrical connector (see FIG. 3, 326a,b, 327a,b) such as a USB (type-A, -B, or -C, mini, or micro), Lightening, RS232, RJ11, RJ45, or any other standardized or proprietary connector that allows the devices to connect directly or via a cable. Docking station 101 and personal computer wireless device 103 may also be linked using pogo pins or probes (not shown) on one device that engage contacts on the other device. Such probes may have a fixed length or may be spring-loaded. Any number of connectors, probes, and contacts may be used and may be arranged in any appropriate configuration or format (e.g., all in one line, distributed in a matrix or array, etc.). The male and female side of the connectors or probes may be located on either docking station 101 or personal computer wireless device 103.

In other embodiments, docking station 101 and personal computer wireless device 103 may be communicatively coupled via an RF interface, such as connections based on Wi-Fi, Bluetooth, ZigBee, WiMAX, Near-field communication (NFC), or other communication protocols or standards. The RF connection may be used to pass data between docking station 101 and personal computer wireless device 103 at the same time (i.e., simultaneously) as the light signals 104c, 105c and/or connectors/probes. Alternatively, the RF connection may be the only data link between the devices. Personal computer wireless device 103 may also communicate with other devices, such as a wireless access point or router (not shown) via an RF connection.

In some embodiments, docking station 101 may provide wireless power to personal computer wireless device 103 using time-varying electric, magnetic, or electromagnetic fields. Wireless power transmission provides power to personal computer wireless device 103 without requiring a direct physical connection (e.g., connector or probes). Wireless power transmission may be non-radiative or radiative. In near field or non-radiative techniques, power is transferred over short distances by magnetic fields using inductive coupling between coils of wire, or by electric fields using capacitive coupling between metal electrodes. In far-field or radiative techniques, power is transferred by beams of electromagnetic radiation, such as microwaves or laser beams. Docking station 101 and personal computer wireless device 103 may be configured with the appropriate circuitry (e.g., coils, armatures, or antennas) to support either non-radiative or radiative wireless power transmission.

Embodiments of the present systems and methods for providing wireless communications, as described herein, may be implemented or executed, at least in part, by one or more computer systems. FIG. 2 is a block diagram depicting a communication device 200 according to an example embodiment. Communication device 200 may represent docking station 101 or personal computer wireless device 103, for example. As illustrated, communication device 200 includes one or more processors 201A-N coupled to a system memory 202 via bus 203. Communication device 200 may further include a network interface 204 coupled to bus 203. Network interface 204 may provide a wired connection to an external network 205, which may provide communication connections to other systems, servers, and networks. Network interface may also provide a physical electrical connection between docking station 101 and personal computer wireless device 103, such as by a connector, probe, or contact. One or more input/output (I/O) controllers 206 are coupled to peripheral devices, such as handset, microphone, or speaker 207, keypad or keyboard 208, display(s) 209, and other devices, such as a cursor control device (e.g., a mouse, touchpad, or stylus), light, camera, etc. Each of devices 207, 208, and 209 may be a separate component that is capable of communicating with I/O controller 206 via a wired connection (e.g., serial port, Universal Serial Bus port) or wireless connection (e.g., Wi-Fi, Bluetooth, Near Field Communications Link, etc.). Other devices, such as scanners, printers, or peripheral devices, may also be coupled to I/O controller 206. In other embodiments, one or more of devices 207, 208, and 209 may be an integral component of communication device 200.

In various embodiments, communication device 200 may be a single-processor system including one processor 201A, or a multi-processor system including two or more processors 201A-N (e.g., two, four, eight, or more processors). Processors 201 may be any processor capable of executing program instructions. For example, in various embodiments, processors 201A-N may be general-purpose or embedded processors implementing any of a variety of Instruction Set Architectures (ISAs), such as the x86, PowerPC®, ARM®, SPARC®, or MIPS® ISAs, or any other suitable ISA. In multi-processor systems, each of processors 201A-N may commonly, but not necessarily, implement the same ISA. Also, in some embodiments, at least one processor 201 may include a Graphics Processing Unit (GPU) or another dedicated graphics-rendering device.

System memory 202 may be configured to store program instructions and/or data accessible by processor 201. In various embodiments, system memory 202 may be implemented using any suitable memory technology, such as Static Random-Access Memory (SRAM), Synchronous Dynamic RAM (SDRAM), nonvolatile/Flash-type memory, or any other type of memory. As illustrated, program instructions and data implementing certain operations and modules such as those described herein may be stored within system memory 202 as program instructions 210 and data storage 211, respectively. In other embodiments, program instructions and/or data may be received, sent, or stored upon different types of computer-accessible media or on similar media separate from system memory 202.

A computer-accessible medium may include any tangible and/or non-transitory storage media or memory media such as electronic, magnetic, or optical media—e.g., disk or CD/DVD-ROM coupled to communication device 200 via bus 203. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, Random Access Memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

System memory 202 may include program instructions 210, configured to implement certain embodiments described herein, and data storage 211, comprising various data may be accessible by program instructions 210. Program instructions 210 may be implemented in various embodiments using any desired programming language, scripting language, or combination of programming languages and/or scripting languages (e.g., C, C++, C#, Java™, JavaScript™, Perl, etc.). Data storage 211 may include data that may be used in these embodiments (e.g., recorded communications, profiles for different modes of operations, etc.). In other embodiments, other or different software elements and data may be included.

In an embodiment, bus 203 may be configured to coordinate I/O traffic between processor 201, system memory 202, and any other devices in the system, including network interface 204 or other interfaces, such as I/O interfaces 206. In some embodiments, bus 203 may perform any necessary protocol, timing, or other data transformations to convert data signals from one component (e.g., system memory 202) into a format suitable for use by another component (e.g., processor 201). In some embodiments, bus 203 may include support for devices attached through various types of peripheral buses, such as a variant of the Peripheral Component Interconnect (PCI) bus standard or the Universal Serial Bus (USB) standard, for example. In some embodiments, the function of bus 203 may be split into two or more separate components. In addition, in some embodiments some or all the functionality of bus 203, such as an interface to system memory 202, may be incorporated directly into processor(s) 201A-N.

Network interface 204 may be configured to allow data to be exchanged between communication device 200 and other devices attached to a network, such as other computer systems, or between nodes of communication device 200. In various embodiments, network interface 204 may support communication via wired or wireless general data networks, such as any suitable type of Ethernet network, for example, via telecommunications/telephony networks such as analog voice networks or digital fiber communications networks, via storage area networks such as Fibre Channel SANs, or via any other suitable type of network and/or protocol.

I/O interfaces 206 may, in some embodiments, enable communications with one or more display terminals, keyboards, keypads, touchpads, scanning devices, voice or optical recognition devices, mobile devices, or any other devices suitable for entering or retrieving data by one or more communication device 200. Multiple I/O controllers 206 may be present in communication device 200 or may be distributed on various nodes of communication device 200. In some embodiments, I/O devices may be separate from communication device 200 and may interact with one or more nodes of communication device 200 through a wired or wireless connection, such as over network interface 204.

Light communication may be supported using a light sensor 212 and a receiver/decoder 213 to receive data and a transmitter/encoder 214 and light transmitter 215 to transmit data. Light sensor 212 may be, for example, a camera, image sensor, or photodetector, such as a CMOS sensor or other electronic chip that converts photons to electrons for digital processing. Light sensor 212 detects light and generates an electronic signal for receiver/decoder 213, which extracts data bits that are carried by the light. The extracted bits may carry information that can be used by processors 201A-N. Data can also be sent using LC by encoding data bits using transmitter/encoder 214 into a signal that drives light transmitter 215, which then broadcasts the information as light signals. Any information that can be exchanged over traditional RF data channels can also be exchanged over LC channels, such as digital bit streams, packet data, voice, video, text, or other content. Although the example communication device 200 depicts a system having both transmit and receive capabilities for light communications, it will be understood that in other embodiments only LC transmit components (i.e., transmitter/encoder 214 and light transmitter 215) or only LC receive components (i.e., light sensor 212 and receiver/decoder 213). Such single-direction LC systems may be used, for example, when the communication device 200 only needs to transmit or only needs to receive data via an LC channel.

Light transmitter 215 may be a Light Emitting Diode (LED), for example. Light sensor 212 and light transmitter 215 may use invisible (e.g., infrared) and/or visible light spectrum for high speed data communication. Communication protocols available for LC may be referred to as Light Fidelity (Li-Fi) or Optical Wireless Communication (OWC) and may be defined in IEEE 802.21bb, IEEE 802.15.7m, 802.15.13, or other standards.

Communication device 200 may also support wireless communications via RF channels in addition to LC channels. RF communication may be supported, for example, by antenna 212 and transceiver 213, which may be configured to support any RF interface to a Wireless Local Area Network (WLAN), such as connections based on Wi-Fi, Bluetooth, ZigBee, WiMAX, Near-field communication (NFC), or other communication protocols or standards. In other embodiments, antenna 216 and transceiver 217, which may be configured to support any 2G, 3G, 4G and/or 5G cellular technologies and related protocols that are used by wireless service providers. For example, communication device 200 may be used with any current, legacy, or future cellular technology or protocols, such as Global System for Mobile Communications (GSM), Code-Division Multiple Access (CDMA), General Packet Radio Service (GPRS), cdmaOne, CDMA2000, Evolution-Data Optimized (EV-DO), Enhanced Data Rates for GSM Evolution (EDGE), Long Term Evolution (LTE), Universal Mobile Telecommunications System (UMTS), OpenG technology to improve mobile coverage and capacity inside buildings, Citizens Broadband Radio Service (CBRS), or Digital Enhanced Cordless Telecommunications (DECT), that may be defined by the 3rd Generation Partnership Project (3GPP), all open LTE bands on unlicensed spectrum or any other telecommunications standard development organization.

Communication device 200 may be embodied, for example, as a cellular telephone, mobile telephone, smartphone, cellular-enabled smartwatch, tablet computer, portable personal computer, laptop computer, cellular modem, or other device that supports wireless communication. Communication device 200 may be addressed and/or identified using, for example, International Mobile Equipment Identifier (IMEI), Mobile Subscriber Integrated services Digital Network Number (MSIDN), Mobile Equipment IDentifier (MEID), Equipment Serial Numbers (ESN), International Mobile Subscriber Identity (IMSI), Temporary Mobile Subscriber Identity (TMSI), telephone number, Internet Protocol (IP) address, Media Access Control (MAC) address, or the like.

A person of ordinary skill in the art will appreciate that communication device 200 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein may be implemented in software executed by processing circuitry, hardware, or a combination thereof. The order in which each operation of a given method is performed may be changed, and various operations may be added, reordered, combined, omitted, modified, etc. It is intended that embodiment(s) described herein do not embrace all such modifications and changes and, accordingly, the above description should be regarded in an illustrative rather than a restrictive sense.

A person of ordinary skill in the art will appreciate that communication device 200 is merely illustrative and is not intended to limit the scope of the disclosure described herein. The device may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

FIG. 3 is a block diagram illustrating components of a light communication docking station 301 according to an example embodiment. Docking station 301 may be used to provide an interface between personal computer wireless device 302 and a remote communication network 303 via network 304. Docking station 301 may function to communicate information, such as data packets and/or speech signals, between personal computer wireless device 302 and communication network 303. Additionally, or alternatively, docking station 301 may transfer power from communication network 303 to personal computer wireless device 302.

Docking station 301 has a network interface 305 adapted to connect to network 304. In one embodiment, network 304 is a network of single pairs of low-voltage wires, such as telephone wires (e.g., a standard four wire telephone line with two pairs of copper wires), alarm system wires, intercom wires, etc. Each pair of low-voltage wires may terminate in the form of a telephone jack, connector (e.g., RJ11 connector), or the like for connection to network interface 305. In other embodiments, network 304 may be an Ethernet network that is connected to network interface 305 by a Cat 5 cable (using, for example, an RJ45 connector), or network 304 may be any other communication or data network that is connected to network interface 305 by a coaxial or other cable.

In some embodiments, communication network 303 may include an extended signaling and electrical powering system that provides electrical power and/or communications to docking station 301 over network 304. An example extended signaling and electrical powering system 303, 304, 305 is described in U.S. Pat. No. 8,594,314, titled "Extended Signaling System and Method," the disclosure of which is hereby incorporated by reference herein in its entirety. The extended signaling and electrical powering system in network 303 may enable a source of electrical current to deliver an amount of current over the same existing wiring that is higher than ordinarily provided to enable telephone use over a single pair of low-voltage wires.

The extended signaling and electrical powering system in network 303 may also enable the exchange of telephony and non-telephony signals (e.g., data) between communication system network 303 and docking station 301. As such, although a typical 48 VDC powered telephone line is only sufficient to provide about 25 mA of DC current to a local telephone or device, an extended signaling and electrical powering system may allow the same low-voltage level to deliver a current in excess of 25 mA using the same wiring while providing additional power, signaling, and data communication capabilities. As such, communications network 303 may be configured to deliver at least 40-60 mA or more current to docking station 301 (instead of the typical 25 mA current). Furthermore, communications network 303 may enable the additional current to be converted to a lower voltage but higher current, which is then made available to docking station 301 over the same single pair of wires in network 304. For example, in some implementations, communication network 303 may be capable of providing 100 mA or more current at 5V to docking station 301 over thousands of feet of standard telephone wire in addition to providing signaling channels to enable data communication services.

Controller 306 manages and controls the operation of docking station 301 in one embodiment. Controller 306 may be a microprocessor or application-specific integrated circuit (ASIC) that allows for intelligent operation of docking station 301 by executing software or firmware instructions. In one embodiment, controller 306 functions as a modem to provide a Digital Subscriber Line (DSL) data connection between docking station 301 and communication network 303 over 2- or 4-wire network 304. In other embodiments, network 305 and controller 306 may be hardwired circuitry (e.g., filters, splitters, rectifiers, matching circuits) adapted to couple lines from network 303 to various components in docking station 301.

Docking station 301 includes a power circuit 307 that provides charging and/or operating power to docking station 301 and personal computer wireless device 302. Power circuit 307 may receive power from communication network 303 directly or under control of controller 306. In this embodiment, docking station 301 would be powered by relatively low power that is available across a single pair of wires in network 304. In some embodiments, a local power supply 308 may provide power to docking station 301 and power circuit 307 in addition to or in place of power from network 303. Power supply 308 may be a battery, an AC adapter, or any other power source that is charged, for example, by current from network 303. Power circuit 307 may provide power to personal computer wireless device 302 using light signals between light transmitter 309a and light sensor 309b. Additionally, or alternatively, power circuit 307 provides power via wireless power transmitter 311 (e.g., a coil, armature, or antenna) to a corresponding wireless power receiver (not shown) on personal computer wireless device 302.

Light transmitter 309a and light sensor 309b may also be used to transmit data from docking station 301 to personal computer wireless device 302. Data may be transmitted from personal computer wireless device 302 to docking station 301 using light transmitter 310b and light sensor 310a. The data may comprise digital packets of varying complexity. Additionally, or alternatively, a wireless transceiver 312 may provide an RF interface (e.g., based on Wi-Fi, Bluetooth, ZigBee, WiMAX, Near-field communication (NFC), or other communication protocols or standards) and may exchange data and/or audio wirelessly between docking station 301 and personal computer wireless device 302.

Docking station 301 further includes an input/output circuit 313 that provides an interface to microphone 314 and speaker 315. Input/output circuit 313 receives audio/speech signals from microphone 314 and provides audio/speech signals to speaker 315. Microphone 314 and speaker 315 may be discrete components in docking station 301 and/or may be embodied in a handset 316. When personal computer wireless device 302 is coupled to docking station 301 via light communication using light transmitters 309a, 310b and light sensors 309b, 310a or wireless interface 312, handset 316 (or microphone 314 and speaker 315, individually) provide an additional or extended audio input/output for personal computer wireless device 302. In some embodiments, in place of a separate handset 316, docking station 301 may function as a speakerphone having a built-in speaker 317 and microphone 318.

In one embodiment, circuitry for enabling the functionality of handset 316, microphones 314, 318, and speaker 315, 317 is included in personal computer wireless device 302 so that these components are only operable when personal computer wireless device 302 is coupled to docking station 301. For example, signals for handset 316, microphones 314, 318, and speaker 315, 317 may be routed through light transmitters 309a, 310b and light sensors 309b, 310a so that the components do not work when no device 302 is present. In other embodiments, when no personal computer wireless device 302 is connected to docking station 301, handset 316, microphones 314, 318, and speaker 315, 317 may be connected to communication network 303 for normal telephone service or connected to an intercom system.

Docking station 301 may include a biometric sensor 319 that is coupled to controller 306. Biometric sensor 319 may be used, for example, to verify and/or authenticate a user's identity using facial recognition, fingerprints, finger geometry, iris recognition, vein recognition, retina scanning, voice recognition, or DNA matching.

Other technologies may also be used to verify and/or authenticate a user's identity. For example, docking station 301 may include a radio-frequency identification (RFID) transceiver, interrogator, or reader 320 that is configured to automatically identify and track RFID tags. These RFID tags may be attached to objects or people. For example, RFID tags may be attached to tamper-detecting bracelets that are worn by users and/or attached to personal computer wireless device 302. Docking station 301 can be configured to require detection of a known user RFID tag and/or a known personal computer wireless device 302 RFID tag before allowing personal computer wireless device 302 to be used with docking station 301.

In one embodiment, docking station 301 may be required to authenticate both the user (e.g., using biometrics, RFID, a PIN, etc.) and personal computer wireless device 302 (e.g., using RFID, an electronic or digital certificate, etc.) before allowing access to communication network 303 and/or docking station 301 functionality. RFID transceiver 320 may be used to track and locate personal computer wireless device 302 whether or not they are connected to docking station 301. RFID transceiver 320 may be used with proximity (e.g., ISO 14443 air-interface protocol standard) or vicinity (e.g., ISO 15693 air-interface protocol standard) tags. Proximity RFID tags employ close coupling and need to be in close proximity (e.g., a few centimeters) to the RFID transceiver 320. Vicinity RFID tags can be read at a distance (e.g., a meter or more). When personal computer wireless device 302 has an attached vicinity RFID tag, then personal computer wireless device 302 may be detected when passing docking station 301 even if the personal computer wireless device 302 is not actually connected to docking station 301. Vicinity RFID tags may be used to inventory personal computer wireless devices and/or for finding lost personal computer wireless devices. In an alternative embodiment, the RFID tag is located on docking station 301 and personal computer wireless device 302 has an RFID transceiver that is used to provide location, identification, and authentication functions.

The applications loaded on personal computer wireless device 302 may be available for use whether or not personal computer wireless device 302 is being used by itself or is coupled to docking station 301. For example, communication applications may be used by personal computer wireless device 302 alone or in conjunction with docking station 301 (e.g., handset 316 allows a user to have a more private conversation than using the communication application on personal computer wireless device 302 alone).

In other embodiments, applications on personal computer wireless device 302 may be specifically enabled or disabled when personal computer wireless device 302 is coupled to docking station 301. For example, certain applications on personal computer wireless device 302 may be disabled when the device is coupled to docking station 301. This may be required to isolate the application and/or communication network 303 from each other. This scenario might occur when certain content on communication network 303 (or on docking station 301) should not be accessed or downloaded by personal computer wireless device 302, or when content on personal computer wireless device 302 should not be uploaded to communication network 303 (or to docking station 301). In another example, an application may require more memory than is available on personal computer wireless device 302 or may require content or functionality that is only available on docking station 301 or communication network 303 (e.g., a database, authentication operation, additional graphics processing, lock icon overlay, etc.). When personal computer wireless device 302 is coupled to docking station 301, then this application on personal computer wireless device 302 may be accessed by the user, but would be unavailable (e.g., no icon on display, grayed-out icon, an error pop up message, etc.) when personal computer wireless device 302 is not connected to docking station 301.

There may be additional applications that are stored on or that execute only on docking station 301. Memory 321 may store application software and/or data for execution or use by controller 306. When personal computer wireless device 302 is coupled to docking station 301, then this application on docking station 301 may be accessed by the user. For example, an application stored in memory 321 may be too large to store on personal computer wireless device 302 or may require more processing capability/power than is available on personal computer wireless device 302 alone or might be available only to certain personal computer wireless devices or users. An icon for the application stored or executing on docking station 301 may be shown on display 322 only when personal computer wireless device 302 is coupled to docking station 301 since that is the only time that the application can be accessed by the personal computer wireless device user.

Docking station 301 may also communicate with personal computer wireless device 302 using a separate LC access point 323 in addition to, or instead of, attached light transmitter 309*a* and light sensor 309*b*. LC access point 323 has a light transmitter 324 and light sensor 325 that communicate with light transmitter 310*b* and light sensor 309*b*, for example. Docking station 301 may be coupled directly to LC access point 323 through interface 305 or through a separate network 303. LC access point 323 may be positioned to create an attocell that covers personal computer wireless device 302 when coupled to docking station 301 (e.g., attocell 121, FIG. 1).

In addition to using light communication between docking station 301 and personal computer wireless device 302, docking station 301 may have a physical connector 326*a* adapted to engage a connector 326*b* on personal computer wireless device 302. Connectors 326*a,b* may be, for example, USB (type-A, -B, or -C, mini, or micro), Lightening, RS232, RJ11, RJ45, or any other standardized or proprietary connectors. Alternatively, or additionally, docking station 301 and personal computer wireless device 302 may be linked using pogo pins or probes 327*a* that engage contacts 327*b*. Probes 327*a* may have a fixed length or may be spring-loaded. Any number of probes 327*a* and contacts 327*b* may be used and may be arranged in any appropriate configuration or format (e.g., all in one line, distributed in a matrix or array, etc.). The male and female side of the connectors 326*a, b* or probes 327*a, b* may be located on either docking station 301 or personal computer wireless device 302. Connectors 326*a, b* and/or probes 327*a, b* may be used to pass data (in digital or analog form), audio, and/or power between docking station 301 and personal computer wireless device 302. If both connectors 326*a, b* and probes 327*a, b* are present, they may pass data, audio, and/or power between docking station 301 and personal computer wireless device 302 at the same time (i.e., simultaneously). Alternatively, one of these links might be dedicated to one type of connection (e.g., power) and the other link used for other connections (e.g., data and/or audio).

In some embodiments, docking station 301 and personal computer wireless device 302 may communicate via light communication (e.g. using light transmitters 309*a*, 310*b*, 324 and/or light sensors 309*b*, 310*a*, 325) and/or via RF communication (e.g., using wireless transceiver 312) at the same time (i.e., simultaneously) as connectors 326*a, b* and/or probes 327*a, b*. In some embodiments, docking station 301 may provide power to personal computer wireless device 302 using connectors 326*a, b* or probes 327*a, b*. It will be understood that the size, positioning, orientation, and type of devices shown as connectors 326*a,b* and probes 327*a,b* are merely illustrative and that any appropriate replacement components may be used to provide the same functionality and operational capability as these examples. An example system using physical connectors and probes between a docking station and personal computer wireless device is described in U.S. Pat. No. 10,416,715, titled "Personal Computer Wireless Device Docking Station on Low Power Network," the disclosure of which is hereby incorporated by reference herein in its entirety.

FIG. 4 depicts an example system 400 for using docking stations 401, 402 with personal computer wireless devices 403, 404 according to an example embodiment. Docking stations 401, 402 and personal computer wireless devices 403, 404 are capable of light communication and may also be capable of RF communication. Personal computer wireless devices 403, 404 may be tablet computers or smart phones, for example, that have an internal RF antenna (not shown) and an embedded LC sensor and LC transmitter.

Docking stations 401, 402 and personal computer wireless devices 403, 404 may communicate with each other and with other devices, such as remote server 405, using RF and/or LC networks. Remote server may support certain applications, provide streaming content, store data, or host other services of interest to personal computer wireless devices 403, 404. In an example embodiment, RF communications are supported using an RF access point 406. Once communication is established with RF access point 406, the devices 403, 404 can communicate with each other or with remote server 405 via router 407 and network 408. Network 408 may be a local area network for a home, enterprise, or service provider. Network 408 may be coupled to additional networks, such as Internet 409, which may allow devices 403, 404 to access remote public or private networks, servers, and devices.

Docking stations 401, 402 may be coupled directly to Internet 409 and/or network 408 by a permanent or semi-permanent connection, such as a 2-wire, Ethernet, or other physical connection. When connected to docking stations 401, 402, personal computer wireless devices 403, 404 are also able to access Internet 409 and/or network 408 via an RF or wired connection.

In one embodiment, light communication is supported using LC access points 410, 411, 412. Each LC access point 410, 411, 412 services its own limited coverage area or attocell 413, 414, 415, respectively. Docking stations 401, 402 and personal computer wireless devices 403, 404 must have the appropriate LC capabilities (e.g., photodetector and light transmitter) and be within an attocell 413, 414, 415 in order to communicate with one of LC access points 410, 411, 412. Attocells 413, 414, 415 have a specific coverage area that is limited by the region covered by light from each LC access point 410, 411, 412. In the example depicted in FIG. 4, LC access points 410 and 412 are spotlights that create narrow attocells 413 and 415. On the other hand, LC access point 411 broadcasts a diffuse light pattern that covers a broad area as illustrated by attocell 414.

Narrow attocells 413, 415 may be focused on particular locations, such as a particular docking station 401, 402. Broad attocell 414 may provide coverage over a large area, such as an entire room, conference table, vehicle, or other open space that includes both docking stations 401 and 402. Once communication is established with an LC access point 410, 411, 412, docking stations 401, 402 and/or personal computer wireless devices 403, 404 may communicate with each other and/or with remote server 405 via router 416 and network 408. Router 416 may be coupled to additional LC access points (not shown) to provide additional attocells within a home, office building, campus, complex, or facility. LC access points 410, 411, 412 provide access to additional networks, such as Internet 409, through network 408.

It will be understood that the term "access point" as used herein comprises any device or base station that transmits and/or receives data over wireless communication channels in radio frequency, visible light communication, and/or invisible light communication (which may include infrared light communication) bands. The access point functions as a gateway or portal that allows wireless devices to connect to a wired and/or wireless network. The access point may communicate with one or more wireless devices.

Docking station 401 and personal computer wireless device 403 are located within both narrow attocell 413 and broad attocell 414 and, therefore, may communicate with LC access point 410 and/or 411. However, docking station 401 and personal computer wireless device 403 are located outside attocell 415, which prevents communication with LC access point 412. Similarly, docking station 402 and personal computer wireless device 404 are located within both narrow attocell 415 and broad attocell 414 and, therefore, may communicate with LC access point 411 and/or 412. However, docking station 402 and personal computer wireless device 404 are located outside attocell 413, which prevents communication with LC access point 410.

The ability to narrowly focus the coverage for the attocells 413 and 415 allows system 400 to specifically target selected locations or devices. For example, if personal computer wireless devices 403 and 404 are in the same room, LC access point 411 may be used to communicate with both devices as long as their respective LC sensors and LC transmitters are exposed to light broadcast in attocell 414. Alternatively, or additionally, each device 403, 404 may be individually targeted for communication using LC access point 410 or 412.

The LC sensor and LC transmitter components on the same device (e.g., docking stations 401, 402 and/or personal computer wireless devices 403, 404) may operate in the same or different frequency bands. For example, both may operate in a visible light band or an infrared light band, or one component may operate in a visible light band while the other component operates in the infrared light band. Sub frequencies of the visible light band and infrared light band may also be identified and assigned to different components to avoid interference.

In one embodiment, system 400 may provide telephone services, videoconferencing, online chat, and other communication services to residents of a controlled-environment facility. Residents may use personal computer wireless devices 403, 404 to place voice calls, as well as for video communication. Controlled-environment facility personnel, such as correctional facility corrections officers, may also, in the performance of their duties, employ personal wireless devices, such as tablet computing devices or smartphones.

The personal computer wireless devices 403, 404 may be adapted to only connect to a network provided by the controlled-environment facility, and/or in only certain locations within the controlled-environment facility, such as may be controlled by availability of RF or LC access only being available in certain areas. That is, for example, where streaming and/or downloading may be compartmentalized by leveraging the structure of the controlled-environment facility, such as by limiting the availability of an RF signal or LC signals through the placement of LC access points 410, 411, 412, configuration of LC light directionality, or modification of RF antenna coverage patterns.

Further, the personal computer wireless devices 403, 404 may allow access to apps or content only upon application of security measures. Such security measures may include determining DNS spoofing, DNS redirection, use of proxy servers for privacy and security, biometric validation, password validation, radio-frequency identification (RFID), NFC and/or the like. Also, video or other services for residents may be restricted to specific monitored and controlled areas within the controlled-environment facility. Further, in accordance with embodiments of the present systems and methods, the personal computer wireless devices 403, 404 may have a few fixed apps pre-installed on the device, and installation of further apps on the device may be forbidden (i.e., prevented by modifications to the device's operating system) and/or restricted, such as by requiring permission from a facility administrator. Apps provided on personal computer wireless devices 403, 404 might include apps of particular interest to residents of the controlled-environment facility. For example, personal computer wireless devices 403, 404 provided to inmates of correctional facilities, might include apps that may be of particular use to an inmate, in general, such as access to a legal research service, or of more specific interest, such as providing an inmate nearing release, access to employment searching apps. Hence, such inmate personal computer wireless devices 403, 404 may be used to help soon to be released inmate's transition. For example, the personal computer wireless devices 403, 404 may be used to communicate with a future employer. As such, personal computer wireless devices 403, 404 may be sponsored, or otherwise subsidized by organizations or companies, assisting with the transition of inmates into society.

Correctional facility corrections officers, or other controlled-environment facility personnel, may employ personal wireless devices, such as tablet computing devices or smartphones, in the performance of their duties. These controlled-environment facility personnel devices may be adapted in a manner similar to personal computer wireless devices 403, 404, and/or otherwise approved, for use within the controlled-environment facility. However, such controlled-environment facility personnel devices may be adapted to prevent use by controlled-environment facility residents and/or to provide the controlled-environment facility personnel some degree of control over the personal computer wireless devices 403, 404.

In accordance with embodiments of the present systems and methods, personal computer wireless devices 403, 404 may present via a user interface, apps such as: a controlled-environment facility resident calling application, a video visitation application, a controlled-environment facility resident's manual, a controlled-environment facility resident form submittal program, a controlled-environment facility resident commissary ordering application, a music player, a video player, a web browser (which may be limited to only accessing secure websites and/or third party websites of approved vendors), a document reading program, an email application, a Prison Rape Elimination Act (PREA) information document, a PREA hotline, a legal research application, a job search application, a controlled-environment facility resident grievance submittal application, sick call app, education app, weather app, video mail, resident information app, games, a contacts functionality, etc.

In various embodiments, to access communication services, when a personal computer wireless device 403, 404 is coupled to a docking station 401, 402, a resident may initiate telephone services by lifting the handset on the docking station and/or otherwise initiating a call, such as by launching a communications app on personal computer wireless devices 403, 404. At which time, the resident may be prompted to provide a personal identification number (PIN), other identifying information or biometrics. An interactive voice response (IVR) unit (not shown) may generate and play a prompt, or other messages, to the resident on personal computer wireless devices 403, 404. Personal computer wireless devices 403, 404 may be capable of connecting to a non-resident's (i.e., a person not incarcerated or otherwise committed to a controlled-environment facility) telephone across a Publicly Switched Telephone Network (PSTN) or Internet 409. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

Internal controlled-environment facility connectivity may include LC connectivity disposed in coverage areas 413, 414, 415 of the controlled-environment facility to provide access by personal computer wireless devices 403, 404 disposed in that portion of the controlled-environment facility. These specific areas may be monitored and/or controlled in accordance with embodiments of the present systems and methods. As noted, these specific monitored and controlled areas are referred to herein as "zones." However, such a zone could be any zone within the facility that is defined to a location. For example, the zones discussed herein may include a law library zone, gaming zones, phone call zones, commissary/ordering zones, training/education zones, homework zones, religious zones, etc.

Consistent with the foregoing, where the controlled-environment facility is a correctional facility, a zone 413, 414, 415 may be established in a portion of the correctional facility, such as a resident housing unit, which may be referred to as a pod, section, unit, dormitory, or block, for example. The housing units may be distributed across different buildings, wings, or floors of the controlled-environment facility. The controlled-environment facility also comprises various common spaces, such as dining halls, recreation areas, medical facilities, laundry room, yard (outside), dayrooms, exercise facilities, that may also be designated as separate zones. In a correctional facility embodiment, multiple RF and LC wireless access points 406, and 410-412 may be disposed in each zone of a correctional facility to provide access by personal computer wireless devices 403, 404.

Coverage from LC wireless access points 410, 411, 412 is limited by the broadcast light signals and, therefore, is typically limited to the particular zone 413, 414, 415 in which the LC access point is located.

Embodiments allow a controlled-environment facility to manage how wireless communication devices are used and to monitor where the devices are located within the facility. When compared to prior RF-only devices, wireless communication devices having both RF and LC capabilities provide a controlled-environment facility with increased bandwidth to provide information to residents as well as more precise control over locations wherein the devices and/or features are operable.

A personal computer wireless device 403, 404 (and/or a docking station 401, 402) may be operational only in a specified zone of the controlled-environment facility. Such a geofencing restriction may be based upon the device itself and/or the resident who is using the device (e.g., the logged-in user). Geofencing would allow the staff at the facility to restrict a specific group of devices 401, 403 to operate only within zone 413, for example. In this situation, if a device 403 was moved to zone 413, then device 403 would not function (or would have limited function) no matter which resident was logged-on to the device.

The staff at the facility may also restrict a specific group of residents to using any device only within zone 415. In this situation, if a resident is assigned to zone 415 (e.g., the resident's home POD or classroom), then any device and/or feature that the resident logs into in zone 413 would not function (or would have limited function) whether or not the device was assigned to zone 413 or the device was improperly moved to zone 413. The geofencing restriction may be controlled using LC.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

What is claimed is:

1. A communication system, comprising:
   a network configured to support data, voice, and video communications; and
   a docking station coupled to the network and configured to provide data connections to a personal computer wireless device, the docking station comprising a light communication (LC) transmitter and an LC receiver;
   wherein the personal computer wireless device is configured to communicate with the docking station using light communication; and
   wherein the LC transmitter, the LC receiver, or both establish communication with the personal computer wireless device and an LC access point.

2. The communication system of claim 1, wherein the docking station is coupled to the network over a pair of low-voltage wires having an electrical current sufficient to power the personal computer wireless device.

3. The communication system of claim 1, wherein the docking station further comprises:
   a processor for controlling the docking station according to executable code; and
   memory for storing data and executable code, wherein the executable code comprises instructions for causing the processor to establish LC communication with the personal computer wireless device.

4. The communication system of claim 3, wherein the executable code further comprises instructions for causing the processor to establish LC communication with the LC access point using the LC transmitter, the LC receiver, or both.

5. The communication system of claim 1, wherein the LC transmitter is a Light Emitting Diode (LED).

6. The communication system of claim 1, wherein the LC receiver is a photodetector.

7. The communication system of claim 1, wherein the light communication is established using a visible light spectrum, an invisible light spectrum, or both.

8. The communication system of claim 1, wherein the personal computer wireless device further comprises:
   a light communication (LC) transmitter;
   an LC receiver;
   a processor for controlling the device according to executable code; and
   memory for storing data and executable code, wherein the executable code comprises instructions for causing the processor to establish LC communication with the docking station.

9. The communication system of claim 8, wherein the executable code further comprises instructions for causing the processor to establish LC communication with the LC access point using the LC transmitter, the LC receiver, or both.

10. The communication system of claim 9, wherein the executable code further comprises instructions for causing the processor to identify a current location of the personal computer wireless device based upon LC communication with the LC access point or the docking station or both.

11. The communication system of claim 8, wherein the executable code further comprises instructions for causing the processor to:
    enable one or more selected applications on the personal computer wireless device based upon a current location.

12. The communication system of claim 8, wherein the executable code further comprises instructions for causing the processor to:
    disable one or more selected applications on the personal computer wireless device based upon a current location.

13. The communication system of claim 8, wherein the executable code further comprises instructions for causing the processor to:
    generate a transmission from the personal computer wireless device to report a current location to a remote device.

14. The communication system of claim 8, wherein the executable code further comprises instructions for causing the processor to:
    periodically update a current location of the personal computer wireless device based upon communication with the LC access point or the docking station.

15. The communication system of claim 8, wherein the executable code further comprises instructions for causing the processor to:
    establish a session with a remote device; and
    exchange session data with the remote device using LC communication with the docking station.

16. The communication system of claim 15, wherein the session and session data are associated with one or more of phone call, video visitation, email, messaging, gaming, and entertainment.

17. A method for accessing a communication system, comprising:
    connecting a personal computer wireless device to a docking station using light communication (LC), wherein the docking station is connected to a network that is configured to support data communications, and wherein the docking station comprises an LC transmitter and an LC receiver;
    establishing communications between the personal computer wireless device and the docking station using light communication;
    establishing communications between the LC transmitter, the LC receiver, or both with the personal computer wireless device and with an LC access point; and identifying a current location of the personal computer wireless device based upon LC with the docking station or an LC access point.

18. The method of claim 17, further comprising:
enabling one or more selected applications on the personal computer wireless device based upon the current location; or
disabling one or more selected applications on the personal computer wireless device based upon the current location.

19. The method of claim 17, further comprising:
establishing a session between the personal computer wireless device and a remote device; and
exchanging session data with the remote device using LC communication with the docking station.

20. The method of claim 17, wherein the personal computer wireless device is configured for use in a controlled-environment facility, and wherein the controlled-environment facility has a plurality of separate LC-accessible zones, and wherein identifying the current location of the wireless device further comprises:
identifying a specific LC-accessible zone in which the personal computer wireless device is located.

21. The method of claim 17, further comprising:
tracking the personal computer wireless device across a plurality of locations, wherein each of the plurality of locations are associated with a different LC access point light transmitter or a docking station light transmitter or both.

22. The method of claim 17, further comprising:
generating an alert when the personal computer wireless device is not authorized for operation in the current location.

23. The method of claim 17, further comprising:
generating an alert when a current user of the personal computer wireless device is not authorized in the current location.

24. The method of claim 17, further comprising:
allowing the personal computer wireless device to access a camera on the docking station or on the personal computer wireless device in response to connecting the personal computer wireless device to the docking station.

25. The method of claim 17, further comprising:
allowing the personal computer wireless device to access one or more peripheral devices in response to connecting the personal computer wireless device to the docking station.

26. The method of claim 25, wherein the one or more peripheral devices are selected from the group consisting of a printer, a scanner, a keyboard, a mouse, a trackball, a handset, a local memory store, a cloud-based memory store, a media capture device, a biometric sensor, and an RFID transceiver.

\* \* \* \* \*